April 27, 1926.
A. FLETTNER
1,582,391
GOVERNING OF SURFACES MOVING WITHIN A NONRIGID MEDIUM
Filed Feb. 3, 1922
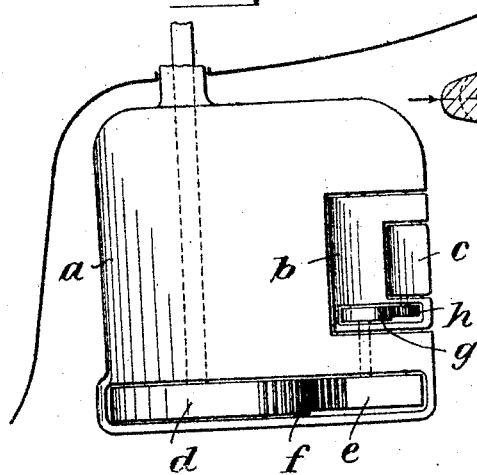
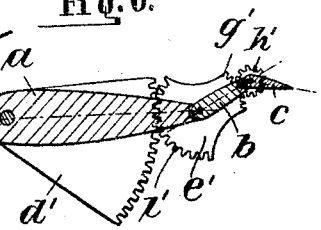
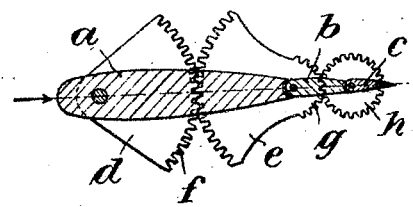
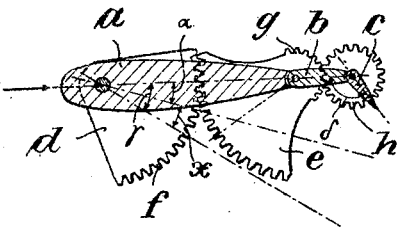
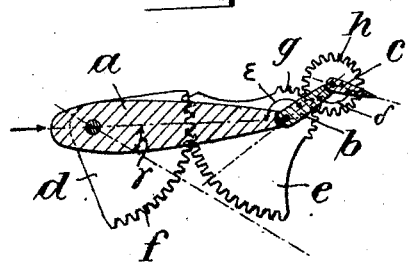
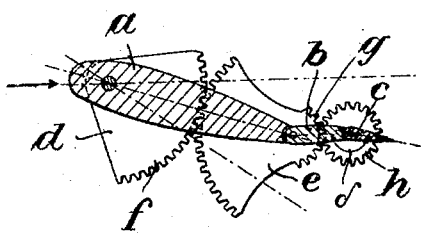
Inventor
Anton Flettner
by *[signature]*
Attorney Patented Apr. 27, 1926.

1,582,391

UNITED STATES PATENT OFFICE.

ANTON FLETTNER, OF BERLIN, GERMANY.

GOVERNING OF SURFACES MOVING WITHIN A NONRIGID MEDIUM.

Application filed February 3, 1922. Serial No. 533,830.

*To all whom it may concern:*

Be it known that I, ANTON FLETTNER, a citizen of Germany, residing at Berlin, Germany, have invented certain new and useful Improvements in and Relating to the Governing of Surfaces Moving Within a Nonrigid Medium, of which the following is a specification, which is a continuation in part of applicant's copending application Ser. No. 392,839 filed June 29, 1920.

My invention refers to devices for governing surfaces moving within a non-rigid medium such as water or air.

In order to displace and more especially to turn surfaces moving within a non-rigid medium for the purpose of steering a ship or aerial craft, or for some other purpose, it has been proposed to utilize the force of the air or water current so as to cause it to act on the main surface by way of a number of auxiliary surfaces connected in series. This manner of proceeding, however, does not solve the problem which consists therein that it is imperative to carry the auxiliary surfaces, while the main surface is executing the desired movement, back into their initial position relatively to the surface which each of them is designed to act upon, and at the same time to set the auxiliary surfaces and especially the last one (counting from the main surface) at such an angle that they are enabled effectually to counteract any undesirable movement of any surface, and quite especially the main surface, which may be caused by the current.

According to the present invention, this is now attained by coordinating to each surface, with the only exception of the last auxiliary surface (counting from the main surface) a member capable of turning relatively thereto and which governs the direction and the extent of its angular motion. This member shall be termed hereinafter the "direction governor".

The direction governors of the single surfaces are coupled with one another. They form parts of a sympathetic system acted upon directly by the current and serving to make the surfaces follow the angular movements of the direction governors.

In the drawings affixed to this specification and forming part thereof my invention is illustrated in a purely diagrammatic manner by way of example as applied to a ship's rudder. But I wish it to be understood that it may as well be applied with great advantage to the steering surfaces of aerial craft such as airships or flying-machines or for the purpose of setting (turning) surfaces which by their motion within the current do work or take it up, such as for instance the vanes (blades) of propellers, air or water conveyors (pumps) fans or ventilators, compressors, wind mills, adjustable supporting surfaces of aerial craft, and the like. On all such surfaces as are disposed at an angle to a streaming medium, auxiliary surfaces serving to displace the main surface can be provided, in accordance with an invention described by applicant in another application, such auxiliary surfaces serving to turn the main surfaces. These auxiliary surfaces can be provided with direction governors which will act in the same manner as the direction governors described herein with regard to rudders.

Figure 1 is a diagrammatic elevation of a ship's rudder with two auxiliary rudders connected to it, while Figures 2–6 are plan views, partly in section of the same rudder illustrating different positions of the parts cooperating in steering the ship.

Referring to Fig. 1, $a$ is the main surface capable of turning about an axis connected with the hull of the vessel and which is intended to be set (turned) by the pressure of the current. $b$ and $c$ are two auxiliary surfaces connected in series, the surface $b$ being capable of turning within an indent of the main surface $a$ or about lever arms extending from this latter, while the surface $c$ is capable of turning within an indent of the surface $b$ or about lever arms extending from the latter surface. To the surfaces $a$ and $b$ there are co-ordinated separate direction governors which assign to their respective surfaces the direction in which they shall move, the amount of angular movement being dependent upon the position given to the governors. The direction governors $d$ of surface $a$ which can be moved angularly from within the vessel by means of its spindle and is apportioned to the surface $a$, is coupled with the direction governor $e$ of surface $b$ by teeth $f$, and the direction governor $e$ is coupled directly with the spindle of the last auxiliary surface $c$ by teeth $g$ and pinion $h$. The respective surfaces are free in relation to the respective spindles on which the direction governors are mounted.

Fig. 2 is a sectional plan view illustrating the like system in a different, still more simplified manner.

If it be now intended that the pressure of the current turn the main surface $a$ from the original position shown in Fig. 2 and which coincides with the direction of the current indicated by an arrow, a predetermined amount, say through an angle $\alpha$ (Fig. 3), then the direction governor $d$ is first of all set at an angle $\gamma$, which is equal to $\alpha$, increased by a predetermined amount $\chi$, of which more will be said hereinafter. The turning of $d$ causes the direction governor $e$ to be turned also and to turn, by means of the teeth $g$, and the pinion $h$ the last auxiliary surface $c$ (Fig. 3).

This surface $c$ now forms an angle $\delta$ with the surface $b$, and in consequence thereof the current will create an underpressure on the convex side, and an overpressure on the concave side of the system. The difference of pressure now causes the surface $b$ to turn.

As surface $b$ is turning, $h$ is rolling on $g$, and this will cause $c$ to be turned back and the angle $\delta$ to be enlarged. However, the surface $c$ will not be turned back into its zero position ($\delta = 180°$) with regard to $b$, but merely into a position where the current forces acting on the two surfaces are balanced (Fig. 4).

The auxiliary surface $b$ being thus set now forms with the main surface $a$ an angle $\xi$. On the convex side of the system $a$ $b$ the current now creates an underpressure, on the concave side an overpressure, and the difference of pressure causes the main surface to be turned in the direction predetermined by its direction governor. While this is going on, $e$ rolling on $f$ causes the direction governor $e$ of surface $b$ to be turned back. This movement executed by $e$ is transmitted by way of its teeth $g$ on to the surface $c$, which is thus imparted an additional turning back motion (Fig. 5).

Of course the setting of the surfaces which in the foregoing has been decomposed into its single phases, which overlap one another, does not take place in such manner that at first merely surface $b$ will execute its complete movement, and only thereafter surface $a$ starts moving. In reality a slight turning of auxiliary surface $c$ will cause auxiliary surface $b$ to be turned and to set the main surface $a$ turning; in a like manner the running back of the auxiliary surfaces takes place simultaneously. In order to compensate for the turning back and to destroy the equilibrium of forces which had been restored thereby too soon, it is imperative that the direction governor of the main surface which shall be turned through an angle $\alpha$, be not turned merely through the angle $\alpha$, but through $\alpha + \chi$. In some cases $\chi$ may even be a multiple of $\alpha$.

However, in order to obtain as rapid and energetic an action as possible of the rudder, while keeping the power required as low as possible, I prefer replacing the simple coupling of the direction governors amongst one another as well as with the last auxiliary surface by a coupling having a higher gearing ratio.

This is illustrated for instance in Fig. 6. The high ratio of gearing from the direction governor $d'$ of the main surface on to the direction governor $e'$ of the first auxiliary surface $b$ and from this on to the pinion $h'$ of the second auxiliary surface $c$ effects even with a short displacement of $d'$, a large deflection of $b$ and $a$.

This gearing to the higher ratio from the main surface on to the last auxiliary surface can be distributed over the single parts in different ways, either uniformly increasing and decreasing or else, and this is preferable, gradually increasing, as shown in Fig. 6, that is to say, by a higher speed ratio between the direction governor of the main surface and the direction governor of the first auxiliary surface, and by a further higher speed gearing ratio between the direction governor of the first auxiliary surface and the second auxiliary surface. The power required for turning the whole system mainly depends upon the size of the last auxiliary surface.

Besides the great speed of turning and carrying back and the almost perfect consonance between the surfaces and their direction governors, the arrangement according to the present invention involves the further advantage that the system of surfaces will quickly counteract all deflections which might be caused by secondary currents acting on the main surface.

The arrangement which comprises a higher speed gearing ratio between the single direction governors up to the smallest auxiliary rudder, involves the further special advantage consisting therein that the counter-action will also be accelerated and reinforced by the higher speed ratio of the gearing. In this case as well, the gradual increase of gearing results in the effect that now each surface, owing to the higher speed gearing ratio of its direction governor, is protected against incorrect deflection by a quick and energetic counter-action of the next succeeding surface.

The modification above described merely referred to a combination of a main surface and two auxiliary surfaces. However, my invention can be applied with advantage also in the case where more than two auxiliary surfaces are connected in series or where a plurality of auxiliary surfaces act on a single main surface in parallel connection. As mentioned above my invention may be applied to the steering of aerial craft and ships and quite especially serve for reducing the power required in actuating a ship's rudder. This is possible even in the case of the largest ships inasmuch as so many auxiliary surfaces may be disposed in series that the steering of the vessel is greatly facilitated, the last auxiliary surfaces being actuated with a small effort either by hand or by means of a gyroscope. However, my invention is not limited to steering but may be applied also, as mentioned above, to such surfaces as in moving within the surrounding medium take up or deliver useful work. Furthermore my invention is not only applicable to auxiliary surface arrangements, in which a direction governor is permanently being actuated; it may be applied also with great advantage in cases where surfaces, such as the supporting surfaces of flying-machines, vanes, propellers, windmills and the like, shall be permanently held in a predetermined position.

I claim:

1. A device of the kind described comprising in combination, a main surface adapted to be acted upon by the current-pressure of a non-rigid medium, a plurality of auxiliary surfaces connected in series with said main surface and a member coordinated to each surface (with the only exception of the last auxiliary surface, counting from the main surface) and capable of being turned relatively thereto, said member being adapted to govern the direction of turning of its coordinated surface.

2. A device of the kind described comprising in combination, a main surface adapted to be acted upon by the current-pressure of a non-rigid medium, a plurality of auxiliary surfaces connected in series with said main surface and a member coordinated to each surface (with the only exception of the last auxiliary surface, counting from the main surface) and capable of being turned relatively thereto, said member being disposed coaxially to said surface and adapted to govern the direction of turning of its coordinated surface.

3. A device of the kind described comprising in combination, a main surface adapted to be acted upon by the current-pressure of a non-rigid medium, a plurality of auxiliary surfaces connected in series with said main surface, a member coordinated to each surface (with the only exception of the last auxiliary surface, counting from the main surface) and capable of being turned relatively thereto, said member being adapted to govern the direction of turning of its coordinated surface and coupling means between two members designed for higher speed ratio (counting from the main surface).

4. A device of the kind described comprising in combination, a main surface adapted to be acted upon by the current-pressure of a non-rigid medium, a plurality of auxiliary surfaces connected in series with said main surface, a member coordinated to each surface (with the only exception of the last auxiliary surface, counting from the main surface) and capable of being turned relatively thereto, said member being adapted to govern the direction of turning of its coordinated surface and coupling means between the single members and between the last member and the last auxiliary surface designed for higher speed ratio from the main surface through to the last auxiliary surface.

5. A device of the kind described comprising in combination, a main surface adapted to be acted upon by the current-pressure of a non-rigid medium, a plurality of auxiliary surfaces connected in series with said main surface, a member coordinated to each surface (with the only exception of the last auxiliary surface, counting from the main surface) and capable of being turned relatively thereto, said member being adapted to govern the direction of turning of its coordinated surface, and coupling means between each pair of adjoining members and between the last member and the auxiliary surface designed for higher speed ratio from each pair to the next succeeding pair.

6. A device of the kind described comprising in combination, a main surface adapted to be acted upon by the current-pressure of a non-rigid medium, a plurality of auxiliary surfaces connected in series with said main surface, a member coordinated to each surface (with the only exception of the last auxiliary surface, counting from the main surface) and capable of being turned relatively thereto, said member being adapted to govern the direction of turning of its coordinated surface, and coupling means between each pair of adjoining members and between the last member and the auxiliary surface designed for higher speed ratio, the turning speed of the auxiliary surface being greater than the turning speed of the first of said members.

In testimony whereof I affix my signature.

ANTON FLETTNER.